(12) United States Patent
Boezen

(10) Patent No.: US 8,324,935 B2
(45) Date of Patent: Dec. 4, 2012

(54) BUS DRIVER CIRCUIT

(75) Inventor: Henk Boezen, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/122,911

(22) PCT Filed: Oct. 8, 2009

(86) PCT No.: PCT/IB2009/054420
§ 371 (c)(1),
(2), (4) Date: Apr. 6, 2011

(87) PCT Pub. No.: WO2010/041212
PCT Pub. Date: Apr. 15, 2010

(65) Prior Publication Data
US 2011/0199131 A1    Aug. 18, 2011

(30) Foreign Application Priority Data

Oct. 9, 2008 (EP) .................................. 08105527

(51) Int. Cl.
*H03K 19/0175* (2006.01)
*H03B 1/00* (2006.01)
(52) U.S. Cl. ............................ 326/83; 326/87; 327/109
(58) Field of Classification Search .............. 326/82–87; 327/108, 109
See application file for complete search history.

(56) References Cited

U.S. PATENT DOCUMENTS

| | | | |
|---|---|---|---|
| 5,317,206 A | 5/1994 | Hanibuchi et al. | |
| 5,812,595 A | 9/1998 | Jandu | |
| 5,946,177 A * | 8/1999 | Miller et al. | ..................... 361/56 |
| 6,154,061 A | 11/2000 | Boezen | |
| 6,650,144 B2 | 11/2003 | Boezen | |
| 6,949,963 B2 | 9/2005 | De Haas et al. | |
| 7,019,551 B1 * | 3/2006 | Biesterfeldt | ..................... 326/29 |
| 7,245,165 B2 | 7/2007 | De Langen | |
| 7,436,216 B1 * | 10/2008 | Brunn et al. | ..................... 326/83 |
| 2003/0189441 A1 | 10/2003 | Nguyen et al. | |
| 2007/0057705 A1 | 3/2007 | Kanzaki | |
| 2007/0296463 A1 | 12/2007 | Illegems et al. | |
| 2008/0007882 A1 * | 1/2008 | Bernard et al. | .................. 361/56 |
| 2011/0038084 A1 * | 2/2011 | Lo | ................................... 361/56 |
| 2011/0199130 A1 * | 8/2011 | Hu et al. | ....................... 327/109 |

FOREIGN PATENT DOCUMENTS

| | | |
|---|---|---|
| EP | 0 535 873 A1 | 4/1993 |
| EP | 1 630 682 A2 | 3/2006 |
| WO | 99/57810 A2 | 11/1999 |

(Continued)

*Primary Examiner* — Thienvu Tran

(57) ABSTRACT

A bus driver circuit for driving a bus voltage is provided. The bus driver circuit comprises: a bus line output (CANL) the bus voltage of which is driven by the bus driver circuit; a first transistor (M1) having a gate, the voltage at the gate of the first transistor (M1) determining the bus voltage at the bus line output (CANL); a first capacitor (C1) connected to the gate of the first transistor (M1) for driving the voltage at the gate of the first transistor (M1); a first switch (S1) connecting/disconnecting the first capacitor (C1) to a first voltage source (Vgm) via a first RC network comprising at least one resistor and at least one capacitor; and a second switch (S2) connecting/disconnecting the first capacitor (C1) to a predetermined fixed potential (GND 2) for discharging the first capacitor (C1) via a second RC network comprising at least one resistor and at least one capacitor. The first switch (S1) and the second switch (S2) are complementarily driven by a signal (TxD) on a data line.

15 Claims, 5 Drawing Sheets

FOREIGN PATENT DOCUMENTS

| | | |
|---|---|---|
| WO | 02/37780 A2 | 5/2002 |
| WO | 02/073804 A2 | 9/2002 |
| WO | 02/073912 A2 | 9/2002 |
| WO | 2004/040758 A1 | 5/2004 |

* cited by examiner

BUS DRIVER CIRCUIT

FIELD OF THE INVENTION

The invention relates to a bus driver circuit. In particular, the invention relates to a bus driver circuit suited for application in bus systems such as CAN (controller area network), LIN, FlexRay, etc.

BACKGROUND OF THE INVENTION

In modern communication systems, in many cases several separate devices are interconnected via a bus system in order to allow e.g. information exchange between the devices, controlling of devices, controlling of a system containing several devices, etc. A plurality of different bus systems has been proposed of which some have been optimized for specific areas of application, e.g. for automotive applications, process automation in large scale industrial applications, etc. Examples for known bus systems are high speed CAN, low speed CAN, LIN, FlexRay, etc.

In such bus applications, several requirements for bus signals exists of which some are mandatory and other may optionally be complied with in order to achieve enhanced performance. In many bus applications, such as in high speed CAN, two bus lines are used for data transmission in ISO/OSI layer 1. In CAN applications, these two bus lines are CANH (high voltage line) and CANL (low voltage line). Data signals are transmitted by using two different levels, a dominant level and a recessive level. For realizing these two levels, the two bus lines are driven symmetrically with respect to an intermediate voltage, as schematically depicted in FIG. 4. As can be seen in FIG. 4, when the bus signal on the bus lines is driven from the recessive level to the dominant level, the signals on both bus lines are changed with a specific slope.

In order to achieve low electromagnetic radiation emission, a very symmetrical output voltage is desired (high symmetry between the signal changes on the two bus lines). In case of a high symmetry, the emissions of the two bus lines will cancel each other and the net disturbance will be smaller as compared to the case of lower symmetry between the signals on the bus lines. In order to achieve high symmetry, the slopes of the two signal changes should correspond and the signal change should take place on both bus lines with the same delay.

WO 99/57810 describes a CAN transmitter for low slope. According to the teaching of this document, high symmetry is achieved by a specific arrangement of the drive circuit.

To achieve good immunity of the bus signal, a bus driver circuit should have a current source output. This is explained for a LIN transceiver in WO 02/073804 A2. In this document, use is made of a current source that has the desired waveform as a function of time in order to achieve an accurate current waveform.

OBJECT AND SUMMARY OF THE INVENTION

It is an object of the present invention to provide, at the same time, good symmetry of respective bus signal lines for low electromagnetic radiation emission, a current mode output for good immunity, and reduced power consumption, and this shall be achieved by a circuit which can be used for both high and low slope applications.

This object is achieved by a bus driver circuit for driving a bus voltage according to claim 1. The bus driver circuit comprises: a bus line output the bus voltage of which is driven by the bus driver circuit; a first transistor having a gate, the voltage at the gate of the first transistor determining the bus voltage at the bus line output; a first capacitor connected to the gate of the first transistor for driving the voltage at the gate of the first transistor; a first switch connecting/disconnecting the first capacitor to a first voltage source via a first RC network comprising at least one resistor and at least one capacitor; and a second switch connecting/disconnecting the first capacitor to a predetermined fixed potential for discharging the first capacitor via a second RC network comprising at least one resistor and at least one capacitor. The first switch and the second switch are complementarily driven by a signal on a data line. Thus, a desired waveform at the bus can be created by pre-shaping the gate voltage drive to the output which is provided by the first capacitor. The shape of the waveform is determined by the respective resistances and capacitances of the components of the first and second RC networks. Thus, the desired waveform can be set by choosing the appropriate characteristics of the RC networks.

Preferably, the first RC network comprises a first resistor and second capacitor connected in series, the serial connection of the first resistor and the second capacitor being connected in parallel to the first capacitor when the first switch is switched on. In this case, the first capacitor is charged in a predetermined way and to a predetermined voltage when the first switch is switched on.

Preferably, the first RC network comprises a second resistor connected between the first voltage source and the first switch. In this case, the first capacitor is charged to the output voltage of the first voltage source with a predetermined delay after the first switch has been switched on. The delay can be set by appropriately adjusting the resistance of the second resistor. According to an alternative, the first RC network comprises a current source connected between the first voltage source and the first switch.

Preferably, the second RC network comprises a third resistor and a third capacitor connected in series, the serial connection of the third resistor and the third capacitor being connected in parallel to the first capacitor when the second switch is switched on. In this case, the first capacitor is discharged in a predetermined way and to a predetermined voltage when the second switch is switched on.

Preferably, the second RC network comprises a fourth resistor connected between the predetermined fixed potential and the second switch. In this case, the first capacitor is discharged to the predetermined fixed potential with a predetermined delay. The delay can be set by appropriate selection of the resistance of the fourth resistor. According to an alternative, the second RC network comprises a current source connected between the predetermined fixed potential and the second switch.

Preferably, at least some of the first capacitor, resistors and/or capacitors of the first RC network, and resistors and/or capacitors of the second RC network are divided into a plurality of part resistors or part capacitors which are independently switchable. In a particularly preferred arrangement, all these resistors and capacitors are divided into a plurality of part resistors/capacitors which are each independently switchable. This provides extended adjustment possibilities. However, only some of the resistors and/or capacitors may be divided and switchable in the described manner. For many applications, adjustment of only some resistors/capacitors will provide sufficient adjustment possibilities. Due to the arrangement of independently switchable part resistors and/or part capacitors, the properties of the bus driver circuit (such as slope and delay) can be conveniently adjusted even after the production process of the bus driver circuit without requiring new masks etc.

If the bus driver circuit comprises a control register determining switching of the part resistors and/or part capacitors, adjustment of the properties of the bus driver circuit is possible in a particularly convenient way.

Preferably, a charging accelerating circuit for accelerating charging of the first capacitor after the first switch has been switched on for a predetermined time interval is provided. In this case, the characteristics in the signal at the end of the slope (at the rising edge) can be advantageously adjusted according to the requirements.

Preferably, the charging accelerating circuit comprises a fourth capacitor which becomes slowly charged when the first switch is switched on. This realization ensures that the set-in of acceleration of charging (i.e. the features at the end of the slope) is provided at a pre-determined time after switching of the first switch. Preferably, the voltage across the fourth capacitor controls connecting/disconnecting a further path for charging the first capacitor. Thus, acceleration of charging takes place in a pre-determined way at a predetermined time after switching.

Preferably, a discharging accelerating circuit for accelerating discharging of the first capacitor after the second switch has been switched on for a predetermined time interval is provided. In this case, the characteristics in the signal at the end of the slope (at the falling edge) can be specifically adjusted according to the requirements.

Preferably, the discharging accelerating circuit comprises a fifth capacitor which becomes slowly charged when the second switch is switched on. This realization ensures that the set-in of acceleration of discharging (i.e. the features at the end of the slope at the falling edge) is provided at a pre-determined time after switching of the second switch. Preferably, the voltage across the fifth capacitor controls connecting/disconnecting a further path for discharging the first capacitor. Thus, acceleration of discharging takes place in a predetermined way at a pre-determined time after switching.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
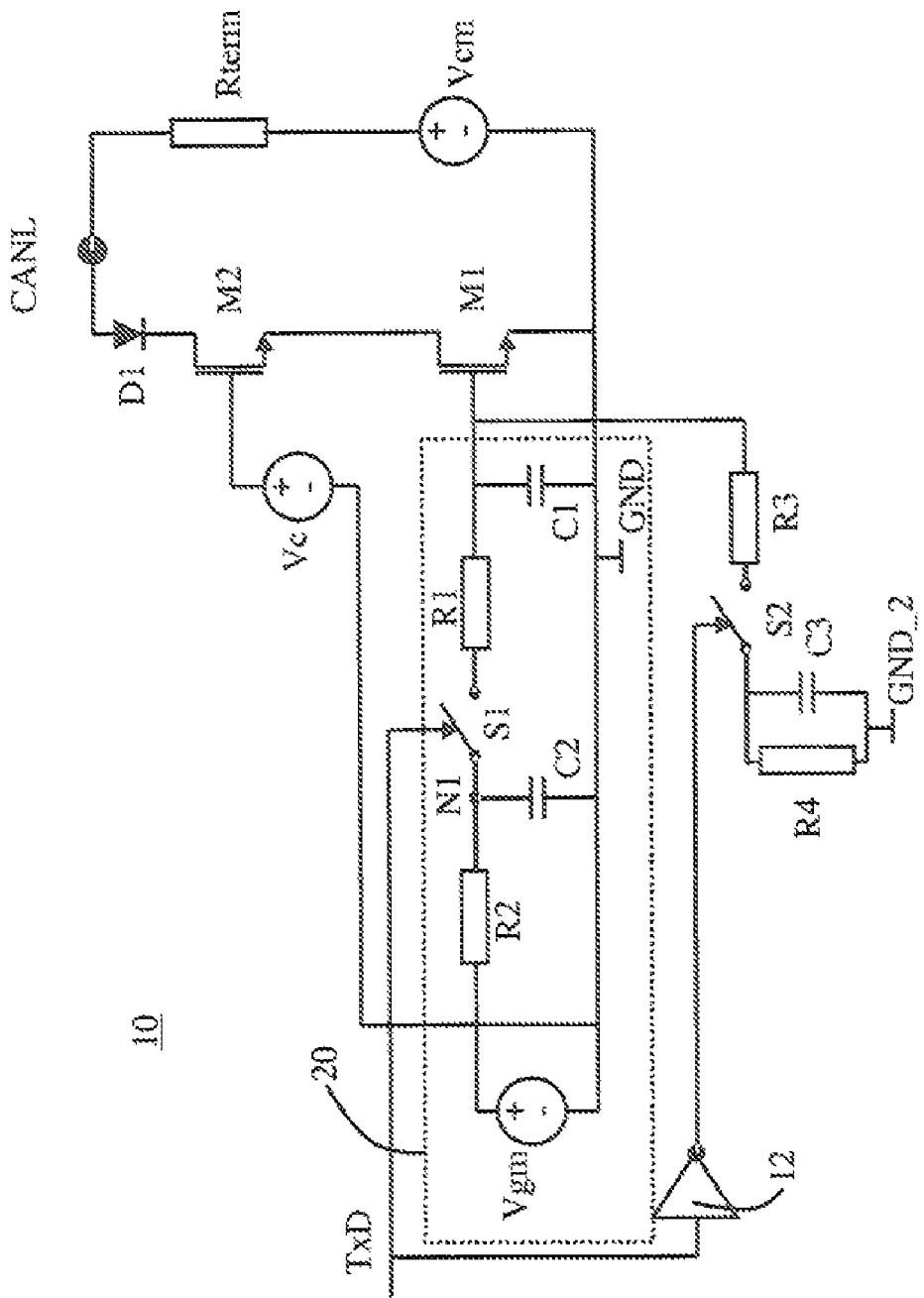
FIG. 1 is a schematic representation of the general construction of a bus driver circuit according to a first embodiment.

A first embodiment will now be described with respect to FIG. 1. FIG. 1 shows a bus driver circuit 10 which is adapted for driving the CANL line in a CAN bus system. Although the embodiment will be described with respect to a CAN bus system, the bus system is not restricted to that and other bus systems are possible as well. The CAN bus system requires two bus lines to be driven, but in the following description only the bus driver circuit for one bus line will be described.

The bus driver circuit for the respective other bus line can be implemented analogously, i.e. a similar bus driver circuit (adapted for driving the other bus line) can be used for driving the other bus line (which is the CANH line in the present example). In the following description, the terms Ci and Ri (i being an integer) will be used to designate both, on the one hand, a capacitor (C) or resistor (R) and, on the other hand, the corresponding capacitance or resistance. Similarly, a reference sign Vi will be used to designate both a voltage source and the corresponding output voltage.

The bus driver circuit 10 comprises a second transistor M2 and a first transistor M1 which are connected in series between the bus line output CANL and a predetermined first potential GND which is preferably formed by ground in the embodiment but can in principle also be formed by another suitable fixed voltage. On the side of the bus line output CANL, a diode D1 is connected between the bus line output CANL and the second transistor M2. The diode D1 is used to avoid currents from flowing in the bus line output CANL when the bus voltage is negative. The first transistor M1 is a low voltage transistor. The second transistor M2 is a high voltage transistor (as compared to the first transistor M1) which is connected as a cascode, with the gate connected to the predetermined first potential GND via a voltage source Vc (which will be designated as a second voltage source). This arrangement protects the first transistor M1 from being subjected to high drain-source voltages. As a further advantage of this arrangement, no high frequency signals at the bus will appear at the drain of the first transistor M1, since the drain-gate capacitance of the second transistor M2 is connected to the predetermined first potential GND (via the second voltage source Vc).

As a result of the described voltage rating (the first transistor M1 being a low voltage transistor and the second transistor M2 being a high voltage transistor), the area of the first transistor M1 is much smaller than the area of the second transistor M2 and the gate-source capacitance of the first transistor M1 is also relatively small. This is particularly important, since mainly the first transistor M1 is used to control the bus line output CANL.

A first capacitor C1 is connected between the gate of the first transistor M1 and the predetermined first potential GND (and thus between the gate and the drain of the first transistor M1). The capacitance of the first capacitor C1 is chosen such that it is large compared to the gate-source capacitance of the first transistor M1. As a consequence, the first capacitor C1 effectively acts like a voltage source driver to the first transistor M1. A first voltage source Vgm is further provided. A first terminal Vgm− of the first voltage source Vgm (the negative terminal) is connected to the predetermined first potential GND. A second terminal Vgm+ of the first voltage source Vgm is connected to the gate of the first transistor M1 via a second resistor R2, a first switch S1, and a first resistor R1 in this order. The resistance of the first resistor R1 is chosen to be low as compared to that of the second resistor R2.

A second capacitor C2 is connected between the predetermined first potential GND and a first node N1. The first node is located between the second resistor R2 and the first switch S1.

The gate of the first transistor M1 is further connected to a predetermined second potential GND_2 via a third resistor R3, a second switch S2, and a fourth resistor R4 in this order. The resistance of the fourth resistor R4 is substantially larger than that of the third resistor R3. Preferably, the predetermined second potential GND_2 is identical to the predetermined first potential GND, e.g. is ground potential in the shown example. This situation will be described in the following. A third capacitor C3 is connected in parallel to the fourth resistor R4 between the predetermined second potential GND_2 and the second switch S2.

The first switch S1 and the second switch S2 are complementarily controlled by a data line TxD, i.e. if the first switch S1 is switched on, the second switch S2 is switched off and vice versa. According to the embodiment, to achieve this, the data line TxD is directly connected to a control terminal of the first switch S1 and is connected to a control terminal of the second switch S2 via an inverter 12.

Further, a resistor Rterm (e.g. a 60 Ohm resistor) and a third voltage source Vcm (e.g. providing an output voltage of 2.5 V) are connected between the bus line output CANL and the predetermined first potential GND.

In the embodiment shown, the data line is the transmission data line TxD and a high voltage on the data line TxD signifies a recessive state and a low voltage on the data line TxD signifies a dominant state.

First, operation of the bus driver circuit 10 when the data line TxD is in the recessive state (when the data line TxD is high) will be described. In this state, the first switch S1 is switched off and the second switch S2 is switched on. As a consequence, on the one hand, the first capacitor C1 is discharged via the third resistor R3, the second switch S2, and the fourth resistor R4. The third capacitor C3 is discharged as well via the fourth resistor R4. On the other hand, the second capacitor C2 is charged to a fixed voltage determined by the output voltage of the first voltage source Vgm via the second resistor R2.

When the data line TxD signal changes to low, the setting of the first and second switches S1 and S2 changes, i.e. the first switch S1 switches on and the second switch S2 switches off. As a result, the second capacitor C2 is quickly (partly) discharged into the first capacitor C1 via the first resistor R1. C1 quickly charges to a value of Vgm*C2/(C1+C2) (with Vgm being the output voltage of the first voltage source Vgm, and C1 and C2 being the respective capacitances of the first and second capacitors). After this quick charging operation, both the second capacitor C2 and the first capacitor C1 are more slowly charged towards values corresponding to the output voltage of the first voltage source Vgm. According to the embodiment, the initial voltage (Vgm*C2/(C1+C2)), as described above, is chosen to be just below the threshold voltage of the first transistor M1. Thus, with the ratio between the capacitance of the first capacitor C1 and that of the second capacitor C2, the delay from the change in TxD to the change in the bus voltage at the bus line output CANL can be set.

With a small further increase of the voltage at the first capacitor C1, the voltage at the bus line output CANL decreases towards the dominant bus level. The voltage at the drain of M1 becomes nearly zero.

When the data line TxD signal changes to high again, the first switch S1 switches off and the second switch S2 switches on. As a consequence, the first capacitor C1 is quickly discharged via the third resistor R3 and the second switch S2 into the third capacitor C3. Thus, the voltage at the gate of the first transistor M1 now becomes Vgm*C1/(C1+C3) with Vgm signifying the output voltage of the first voltage source, C1 signifying the capacitance of the first capacitor, and C3 signifying the capacitance of the third capacitor. According to the embodiment, this voltage is set to a value at which the drain current of the first transistor M1 just starts to decrease. After this rapid initial decrease of the voltage at the first capacitor C1 (the voltage at the gate of the first transistor M1), the first capacitor C1 and the third capacitor C3 are slowly discharged via the fourth resistor R4 having a larger resistance. Thereby, a relatively low slope is created on the bus line output CANL. Here again, the delay can be set by adjusting the ratio between the capacitance of the first capacitor C1 and that of the third capacitor C3.

Figure 5B:
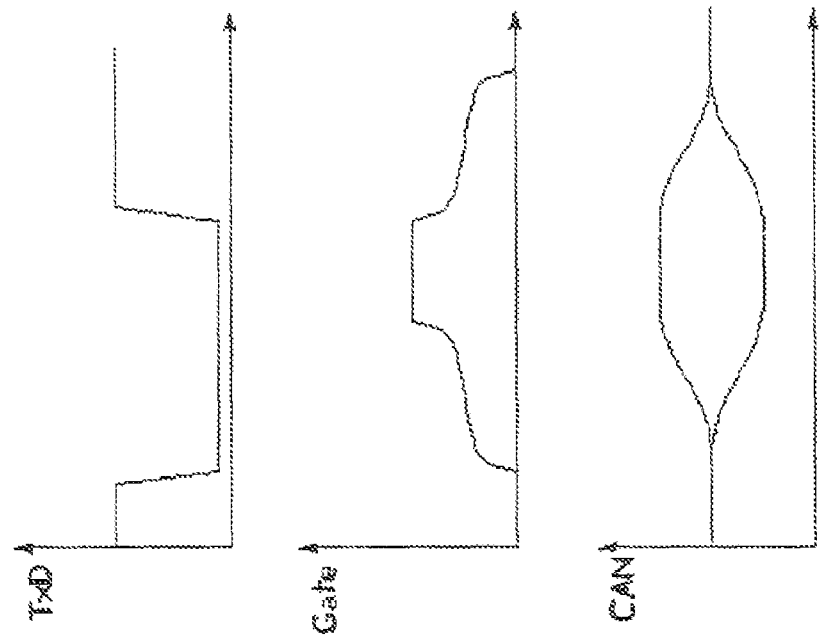
FIG. 5b shows the data line TxD voltage, the gate voltage at the first transistor M1, and the bus voltages CANH, CANL for the case of a low slope.
Figure 5A:
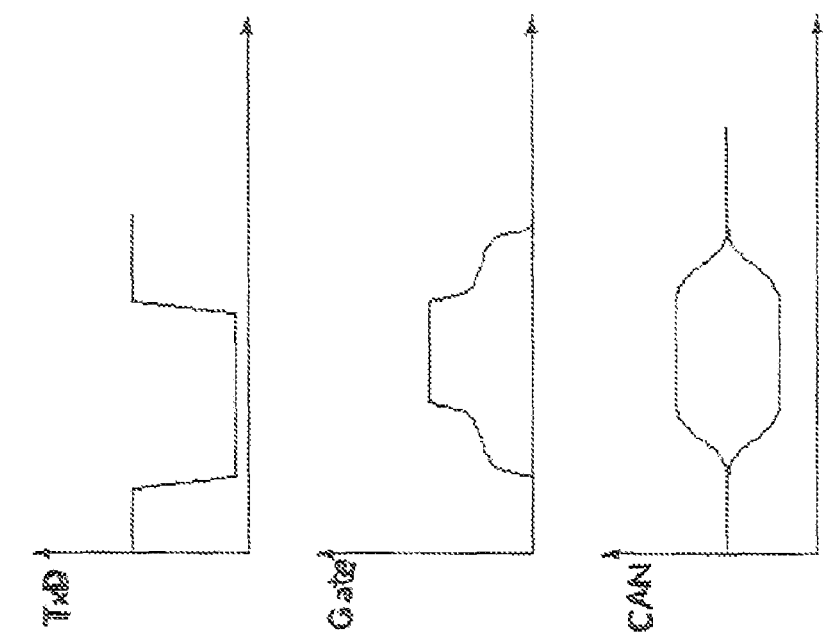
FIG. 5a shows the data line TxD voltage, the gate voltage at a first transistor M1, and the bus voltages CANH, CANL for the case of a high slope.

FIGS. 5a and 5b schematically show the signal waveforms on the data line TxD, at the gate of the first transistor M1 (corresponding to the voltage across C1), and at the bus line outputs CANL and CANH for high slope (FIG. 5a) and for low slope (FIG. 5b), respectively. The slope can be decreased (on the rising edge and on the falling edge) by increasing the resistances of the second resistor R2 and of the fourth resistor R4, respectively. In the description above, only the bus driving circuit for one bus line output (CANL) has been described in detail. However, the schematic representation of the bus signal CAN in FIGS. 5a and 5b is based on the assumption that the bus driving circuit for the respective other bus line output is implemented in an analogous manner.

It has been described above that the delays of the bus signals can be adjusted by adjusting the ratios between the respective capacitances of the first capacitor C1, of the second capacitor C2, and of the third capacitor C3. Further, it has been described that the slopes of the bus signals can be adjusted by adjusting the resistances of the respective resistors R1, R2, R3, and R4.

Figure 2:
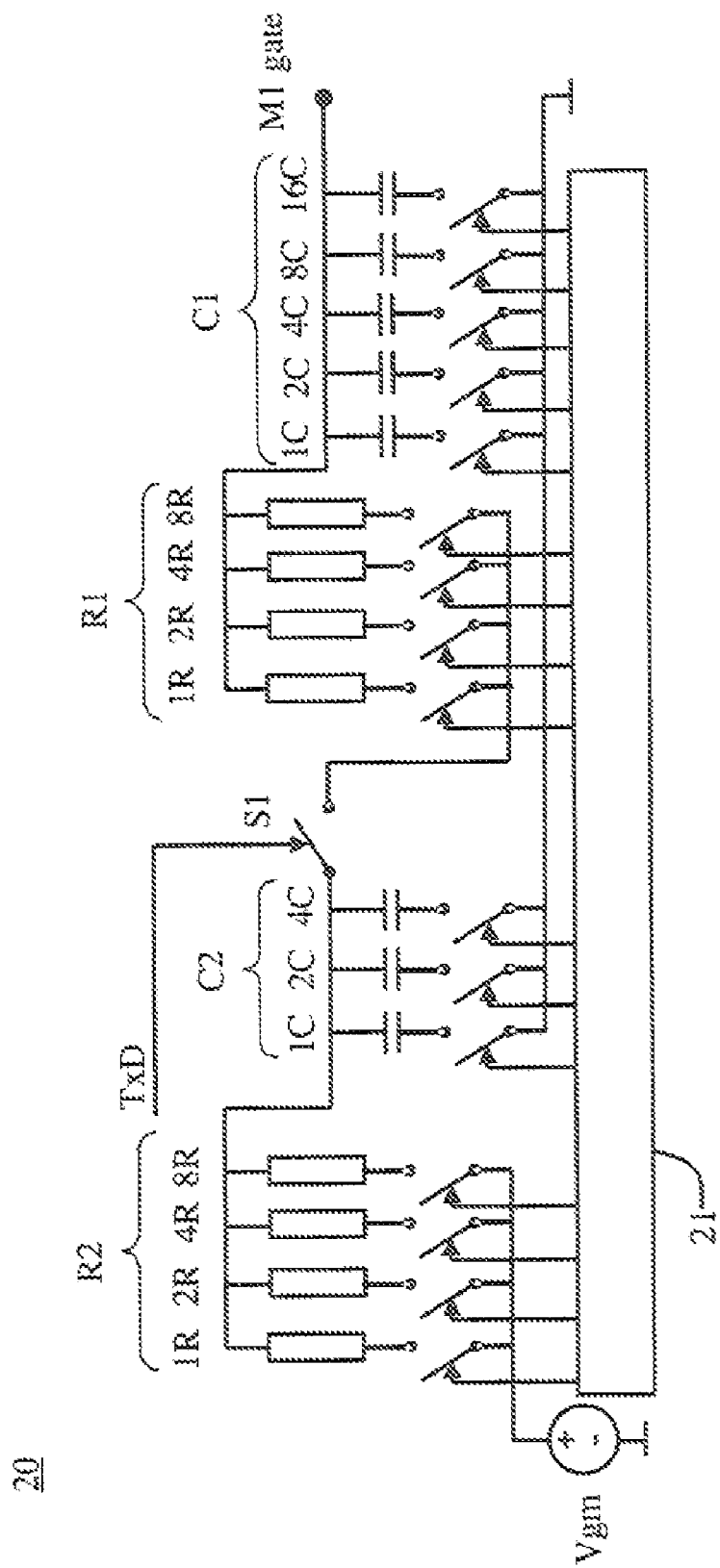
FIG. 2 is a schematic representation of a trimming circuit.

Next, a particularly advantageous trimming circuit 20 which can be used in the embodiment described with reference to FIG. 1 will be described with respect to FIG. 2. The trimming circuit 20 shown in FIG. 2 replaces the portion of the bus driver circuit 10 indicated by the dotted line (comprising R1, R2, C1, C2, S1, and Vgm). As can be seen in FIG. 2, according to the trimming circuit 20, the first resistance R1, the second resistance R2, the first capacitor C1, and the second capacitor C2 are each split into several partial resistors or capacitors (1R, . . . , 8R; 1C, . . . , 16C).

According to the example shown in FIG. 2, the first resistor R1 is split into four separate resistor elements (1R, 2R, 4R, 8R) which can be activated/deactivated independently via allocated switches. Similarly, the second resistor R2 is split into four separate resistor elements which can be activated/deactivated independently via allocated switches. Although it is shown that the first and second resistors R1 and R2 are each split into four elements, the invention is not limited to this and other numbers are possible as well.

Further, the first capacitor C1 and the second capacitor C2 are split into several capacitor elements (1C, 2C, 4C, 8C, 16C) which can be activated/deactivated independently by allocated switches. Again, the splitting is not restricted to the exemplary numbers of three capacitor elements (C2) and five capacitor elements (C1) but other numbers are possible as well.

The switches allocated to the resistor elements (1R, . . . , 4R) and to the capacitor elements (1C, . . . , 16C) are connected to a register 21 in which the information about which of the resistor and capacitor elements are to be activated/deactivated is stored. According to the example shown, the allocated switches are digitally controlled and the register 21 is a digital control register. In this way, the resistances of the first and second resistors R1 and R2 and the capacitances of the first and second capacitors C1 and C2 can be set by a bit pattern provided by the digital control register 21. Since it has been described above that the turn-on delay, turn-off delay, turn-on slope, and turn-off slope depend on the values of these resistances and capacitances, the pattern stored in the register 21 determines these slopes and delays.

Thus, by provision of the adjustable resistors and adjustable capacitors, the features of the bus driving circuit 10 can be advantageously trimmed to achieve the desired results leading to increased symmetry and good immunity.

Although the trimming circuit 20 has been described above with respect to trimming of the values of the first and second resistors R1 and R2 and of the first and second capacitors C1 and C2, the example is not limited to this. Moreover, the values of the third and fourth resistors R3 and R4 and of the third capacitance C3 can be made adjustable in a corresponding way by splitting into different part resistors/capacitors and enabling independent activation/deactivation. Further, not necessarily all of R1, R2, C1, and C2 need to be made adjustable in the manner described above but it may also be sufficient to make only one or a plurality of these components adjustable.

The content of the digital control register for adjusting the respective values can be read, for instance, from a One-Time-Programmable memory. The content of such a memory can e.g. be programmed during a final test of the bus driver circuit to compensate for process variations and to set the correct slope and symmetry of the bus output signals. Another possibility is to provide a calibration circuit (e.g. on the same chip as the bus driver circuit) to find the optimum values after power on and store them in the register.

Figure 3:
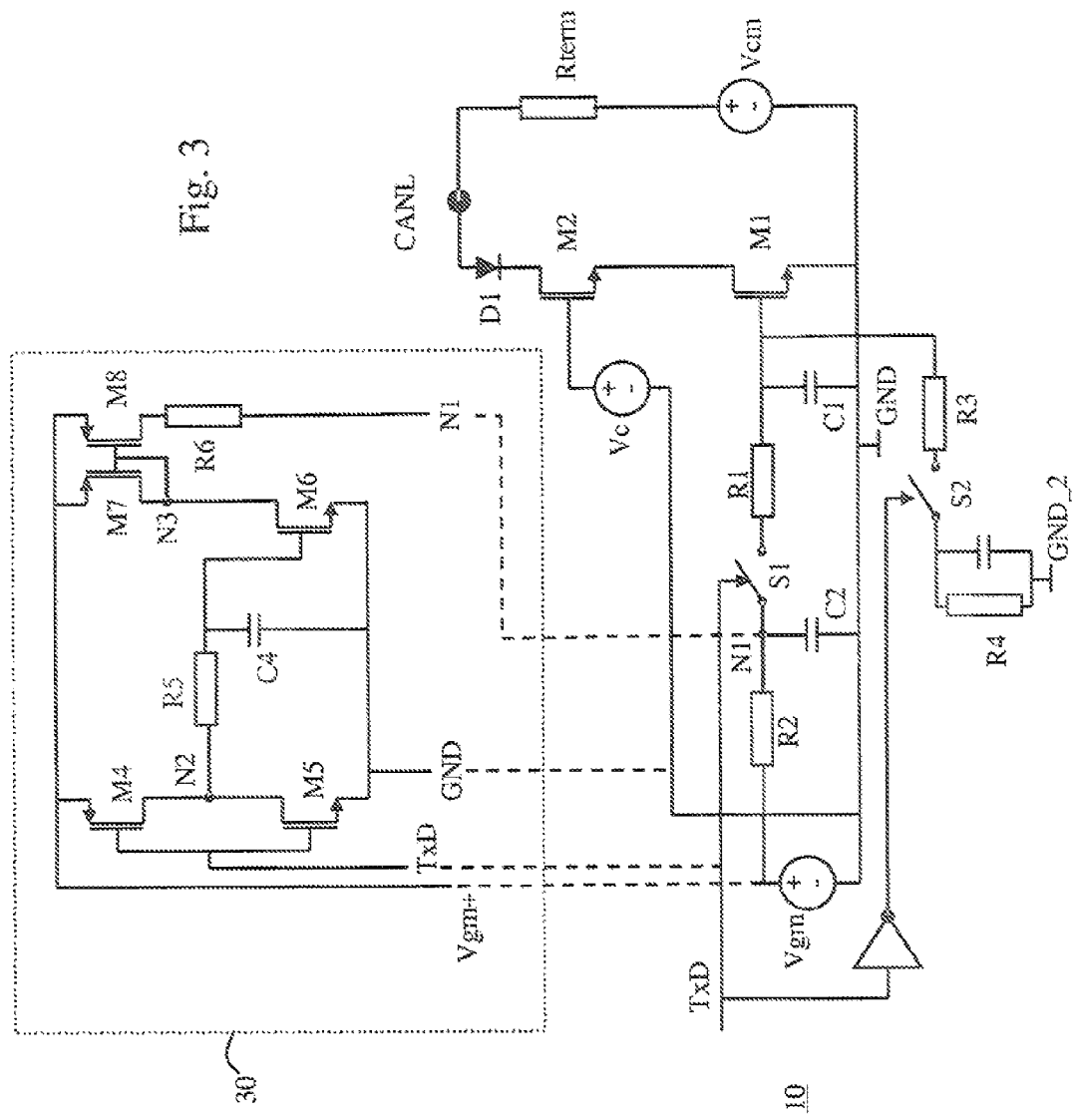
FIG. 3 is a schematic representation of a circuit to speed-up charging of the first capacitor at the end of the slope.
Figure 4:
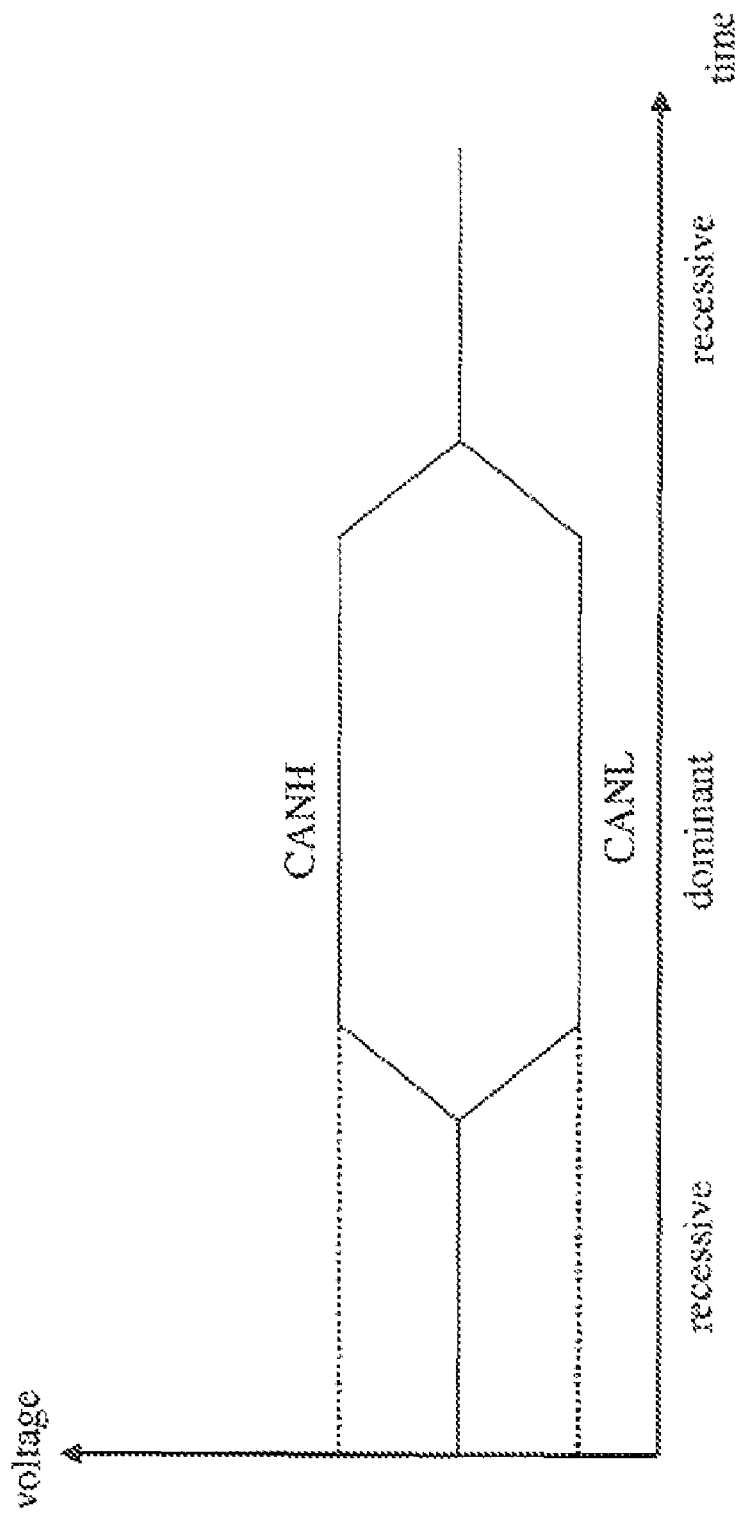
FIG. 4 is a schematic representation of signals CANH and CANL in a CAN bus system.

Now, an additional circuit 30 for speeding-up the charging of the first capacitor C1 at the end of the slope will be described with respect to FIG. 3. In FIG. 3, the additional circuit 30 and its connection to the rest of the bus driver circuit 10 is shown. However, in the following description mainly the features of the additional circuit 30 will be described only.

In the additional circuit 30, a fourth transistor M4 and a fifth transistor M5 are connected in series between the second terminal Vgm+ of the first voltage source Vgm and the predetermined first potential GND. The respective gates of the fourth and fifth transistors M4, M5 are connected to the data line TxD. The fourth transistor M4 and the fifth transistor M5 form an inverter. Further, a seventh transistor M7 and a sixth transistor M6 are also connected in series between the second terminal Vgm+ and the predetermined first potential GND (in parallel to M4 and M5). A second node N2 between the fourth transistor M4 and the fifth transistor M5 is connected to the gate of the sixth transistor M6 via a fifth resistor R5. A fourth capacitor C4 is connected between the gate of the sixth transistor M6 and the predetermined first potential GND. Further, an eighth transistor M8 and a sixth resistor R6 are connected in series between the second terminal Vgm+ and the first node N1 of the bus driver circuit 10. The gates of the seventh and eighth transistors M7 and M8 are interconnected and connected to a third node N3 between the seventh transistor M7 and the sixth transistor M6.

Operation of the additional circuit 30 for speeding-up charging of the first capacitor C1 at the end of the slope will now be described. When the signal on the data line TxD changes to low, the first switch S1 switches on, as has been described above. In this situation, now the fourth capacitor C4 is slowly charged via the fifth resistor R5 the resistance of which is appropriately chosen. As soon as the voltage across the fourth capacitor C4 exceeds the threshold voltage of the sixth transistor M6, a current flows through the seventh transistor M7. This in turn switches on the eighth transistor M8. Now, the eighth transistor M8 connects the sixth resistor R6 in parallel to the second resistor R2 (via which the first capacitor C1 becomes charged at this stage). Consequently, the charging of C1 is accelerated. In this way, due to the provision of the additional circuit 30 for speeding-up charging of the first capacitor C1, the fast rising voltage at the end of the slope which is shown in FIGS. 5*a* and 5*b* is achieved. As has been described, the influences of the additional circuit 30 on the voltage at the bus line output CANL are mainly determined by the values of the resistance of the fifth resistor R5 and the capacitance of the fourth capacitor C4. Similar to the trimming circuit 20 for the first and second resistors R1 and R2 and for the first and second capacitors C1 and C2, the fifth resistor R5 and the fourth capacitor C4 can be split into partial resistors/capacitors. By doing so, the resistance of fifth resistor R5 and the capacitance of the fourth capacitor C4 can be adjusted (e.g. by employing a digital control register) in order to optimize the shape of the final part of the transition (the shape at the end of the slope).

With respect to FIG. 3, a circuit for speeding-up the transition from the recessive to the dominant level at the bus line output CANL has been described. However, the embodiment is not restricted to this. The transition from the dominant level to the recessive level can be sped-up in a similar manner by an analogous circuit connected to that part of the bus driver circuit 10 which contains the third and fourth resistors R3 and R4 and the third capacitor C3. The components of such a circuit can be split and independently switchable as has been described for the other components above.

Although it has been described above with respect to the embodiment that resistors are used for determining and adjusting the slope and delay, the invention is not restricted to this. As an alternative, these resistors can be replaced by current sources, preferably programmable current sources. For example, in the embodiment described above the resistors R2, R4 and R5 can be replaced by (programmable) current sources.

To summarize, according to the embodiment described above, a digitally adjustable gate drive circuit has been described which is capable to provide both low delay and configurable slope. The behavior of the bus transmitter comprising the bus drive circuit 10 (in particular the waveform on the bus, the delay, and the symmetry of the output voltage) can be adjusted late in the development process of the transmitter without requiring new masks (for changing features of circuit elements). An adjustable slope is realized by the proposed circuit. The circuit is not critical to matching. All transitions at the gate and at the bus are smooth which avoids high frequency components in the emission spectrum.

The settings of the bus driver circuit can be fixed during data transmission and only need to be adjusted infrequently, for instance upon temperature changes. This allows realizing low power consumption and low-cost realization of the digital control circuit.

Further, because many parameters of the bus driver circuit (and thus of the bus transmitter employing the bus driver circuit) can be trimmed, non-ideal behavior of the high-voltage output transistors can be compensated for in the drive signal. As a result, the high-voltage output transistors can be realized with smaller overall area.

Thus, a transmitter is provided the output current of which is a precise function of time. The output behaves like a current source. The precision is achieved by driving the gate with a pre-defined voltage. The voltage source consists of a capacitor (C1) the charge of which is controlled in a pre-defined way. In other words, the desired voltage at the bus output is created by pre-shaping the gate voltage drive to the output stage. The shape is made with an RC network. The values of the resistors and capacitors determine the shape of the gate voltage. These values can be adjusted in discrete steps switching capacitors and resistors on and off. According to the described example, a digital control circuit is provided which adapts the shape of the charge current. As a result of this, the shape of the gate voltage and hence the shape of the bus voltage can be adjusted to the desired waveform. Any delay mismatch which might occur can be calibrated away by setting the proper values in the control register. Complementary circuits can be used for the low-side bus line and the high-side bus line and, as a consequence, the respective bus lines can be adjusted independently. The calibration parameters can be tuned to achieve both symmetrical delay and very low common voltages for low electromagnetic emission.

Such a transmitter comprising the above described bus driver circuit is particularly suited for integration in a high-density mix signal process technology. Although an application for high-speed CAN bus systems has been described with respect to the examples above, applications with respect to other bus systems such as LIN, fault tolerant CAN, single-wire CAN, FlexRay etc. are possible as well.

The invention claimed is:

1. A bus driver circuit for driving a bus voltage, comprising:
a bus line output, the bus voltage of which is driven by the bus driver circuit,
a first transistor having a gate, a voltage at the gate of the first transistor determining the bus voltage at the bus line output;
a first capacitor connected to the gate of the first transistor for driving the voltage at the gate of the first transistor;
a first switch connecting/disconnecting the first capacitor to a first voltage source via a first RC network comprising at least one resistor and at least one capacitor; and
a second switch connecting/disconnecting the first capacitor to a predetermined fixed potential for discharging the first capacitor via a second RC network comprising at least one resistor and at least one capacitor; and
the first switch and the second switch being complementarily driven by a signal on a data line.

2. The bus driver circuit according to claim 1, wherein the first RC network comprises a first resistor and a second capacitor connected in series, the serial connection of the first resistor and the second capacitor being connected in parallel to the first capacitor when the first switch is switched on.

3. The bus driver circuit according to claim 1, wherein the first RC network comprises a second resistor connected between the first voltage source and the first switch.

4. The bus driver circuit according to claim 1, wherein the first RC network comprises a current source connected between the first voltage source and the first switch.

5. The bus driver circuit according to claim 1, wherein the second RC network comprises a first resistor and a second capacitor connected in series, the serial connection of the first resistor and the second capacitor being connected in parallel to the first capacitor when the second switch is switched on.

6. The bus driver circuit according to claim 1, wherein the second RC network comprises a first resistor connected between the predetermined fixed potential and the second switch.

7. The bus driver circuit according to claim 1, wherein the second RC network comprises a current source connected between the predetermined fixed potential and the second switch.

8. The bus driver circuit according to claim 1, wherein at least some of the first capacitor, resistors and/or capacitors of the first RC network, and resistors and/or capacitors of the second RC network are divided into a plurality of part resistors or part capacitors which are independently switchable.

9. The bus driver circuit according to claim 8, wherein the bus driver circuit comprises a control register determining switching of the part resistors or part capacitors.

10. The bus driver circuit according to claim 1, wherein a charging accelerating circuit for accelerating charging of the first capacitor after the first switch has been switched on for a predetermined time interval is provided.

11. The bus driver circuit according to claim 10, wherein the charging accelerating circuit comprises a fourth capacitor which charges when the first switch is switched on.

12. The bus driver circuit according to claim 11, wherein the voltage across the fourth capacitor controls connecting/disconnecting a further path for charging the first capacitor.

13. The bus driver circuit according to claim 1, wherein a discharging accelerating circuit for accelerating discharging of the first capacitor after the second switch has been switched on for a predetermined time interval is provided.

14. The bus driver circuit according to claim 13, wherein the discharging accelerating circuit comprises a fifth capacitor which charges when the second switch is switched on.

15. The bus driver circuit according to claim 14, wherein the voltage across the fifth capacitor controls connecting/disconnecting a further path for discharging the first capacitor.

* * * * *